(12) United States Patent
Cadden

(10) Patent No.: US 6,175,933 B1
(45) Date of Patent: Jan. 16, 2001

(54) RECOVERY OF FILE TRANSFERS IN A DATA PROCESSING SYSTEM

(75) Inventor: William Scott Cadden, Saugerties, NY (US)

(73) Assignee: International Business Machines Corporation, Armonk, NY (US)

(*) Notice: Under 35 U.S.C. 154(b), the term of this patent shall be extended for 0 days.

(21) Appl. No.: 08/953,467

(22) Filed: Oct. 17, 1997

(51) Int. Cl.[7] .............................. G06F 11/00; G06F 13/00
(52) U.S. Cl. ................................... 714/15; 714/18
(58) Field of Search ...................... 707/202, 10; 709/203, 709/232, 300, 301, 302; 710/52, 55, 57; 714/15, 18, 16

(56) References Cited

U.S. PATENT DOCUMENTS

| | | | |
|---|---|---|---|
| 4,775,978 | 10/1988 | Hartness | 371/38 |
| 4,935,869 | 6/1990 | Yamamoto | 364/200 |
| 5,289,478 | 2/1994 | Barlow et al. | 371/40.1 |
| 5,296,908 | 3/1994 | Hatano et al. | 355/319 |
| 5,751,719 * | 5/1998 | Chen et al. | 370/473 |
| 5,752,251 * | 5/1998 | Cripps | 707/202 |
| 5,754,754 * | 5/1998 | Dudley et al. | 714/18 |
| 5,761,405 * | 6/1998 | Tadamura et al. | 714/18 |
| 5,768,528 * | 6/1998 | Stumm | 709/231 |
| 5,835,721 * | 11/1998 | Donahue et al. | 709/224 |
| 5,862,335 * | 1/1999 | Welch, Jr. et al. | 395/200.54 |
| 5,912,902 * | 6/1999 | Monroe | 714/746 |

* cited by examiner

Primary Examiner—Paul V. Kulik
(74) Attorney, Agent, or Firm—Lawrence D. Cutter; Floyd A. Gonzalez

(57) ABSTRACT

A system, method and program product for recovering records transferred by a file transfer program from a file transfer client to a file transfer server for storing in an I/O device by the server, wherein the file comprises multiple records in one or more blocks. A file is transferred from the file transfer client to the file transfer server a record at a time, with each record being stored in turn in memory in the server. Each record is then converted by a conversion routine. Recovery information, including the location of the first record in the block in the I/O device, is saved for each record converted by said conversion routine, and the recovery information for each record is sent to the file transfer client to be used to recover the records in the event the file transfer program is stopped. When a full block of records has been received by the file transfer server, and each record has been converted by said conversion routine, the full block is stored, a record at a time, in the I/O device by an I/O routine. In the event that the file transfer program stops, the recovery information is sent from the file transfer client to the file transfer server, and the records of the block stored in the server memory are recovered in accordance with the recovery information received by the file transfer server.

17 Claims, 4 Drawing Sheets

RECOVERY OF FILE TRANSFERS IN A DATA PROCESSING SYSTEM

The present invention relates to file transfers which read to or write from an input/output (I/O) device in a data processing system, and more particularly relates to recovery of file transfers in the event the transfer is stopped before the transfer is complete.

BACKGROUND OF THE INVENTION

A file transfer program is one in which a file is transferred between an application running on a computer and an I/O device in a read or write operation. The file being transferred comprises records grouped into blocks, wherein the blocking of the records is not important to the logical content of the file. The records may be blocked differently depending on where the file is stored. In a source file, the records may be blocked in one way, they may be blocked in another way while being transferred from the source to a destination, and they may be blocked in still another way when they are stored in the destination file.

Five specifications for file transfer programs which are difficult to support at the same time are:

1. A truly generic file transfer program allows users to specify their own I/O routines to read and write files. In this way, the file transfer program can read from and write to any I/O device for which the user has written an I/O routine.
Therefore, there is a requirement for an interface to a generic I/O routine that can handle many types of I/O.

2. When large amounts of data are being transferred, the file transfer program should allow for recovery in case the transfer is stopped for some reason. For example, a transfer might be stopped because a communication mechanism like TCP/IP has crashed, or because a machine must be recycled. When this occurs, it is often desirable to resume the transfer at a later time from the point at which it was stopped.

3. The file transfer program should support mechanisms for monitoring the transfer as it proceeds such as indicators of how far along the transfer is and at what rate it is transferring the file.

4. The file transfer program should support mechanisms for changing the contents of files as they are transferred such as stride, beginning and ending record number, and user supplied conversion routines.

5. The file transfer program should support transfers for file types which do not allow for recovery, such as named pipes useable with the IBM AIX operating system and batch pipes useable with the IBM MVS operating system. Files of these types do not allow a program to index into the middle of a file to start reading or writing from that point.

These five specifications work together to create many difficulties. For instance, at recovery time, parameters, referred to herein as status, used for monitoring the transfer must be set to the correct values so monitoring of status can be resumed. Also, the file changing algorithms (hereinafter referred to as the conversion routine) need to be reset to the correct value from the point at which the transfer must be resumed. Also, the values that the I/O routine must return for recovery may not correspond to the most recent values of the monitoring and file changing information. The I/O routine may need to recover to a point in the transfer well before the one to which the transfer had proceeded when it was stopped. Consider, for example, the file of FIG. 1 which contains blocks 10, 11, and 12. Block 10 includes records 1–6, block 11 includes records 7–12, and block 12 includes records 13–17. A file transfer program will pass the records of this file to an I/O routine, one at a time, for writing to some storage medium. Each block will be placed into memory before it is written to the storage medium. When record 1 is passed to the I/O routine, the routine will place the record in a block of memory, but will not yet write the record to the storage medium. Thus, at this point the I/O routine cannot return recovery information for record 1 to the file transfer program because record 1 has not yet been written to the storage medium. Likewise, records 2 through 5 are passed by the file transfer program, and are also stored in the block of memory, but are still not moved to the storage medium. Thus, for records 1 through 5, no recovery information can be returned to the file transfer program. Only when record 6 has been passed to the I/O routine can the routine store records 1 through 6 in the storage medium. It is then that recovery information can be sent to the file transfer program. The recovery information that is available at that time is the location on the storage medium at the beginning of the block, which is the location of the beginning of record 1 on the storage medium. An example of a file access method that provides this kind of information is the BSAM macros on the MVS operating system by IBM. The BSAM NOTE macro returns the position of the beginning of the block most recently written to disk or tape.

In a similar way, records 7 through 12 are written to the storage medium when record 12 is passed to the I/O routine. The file access method will return the position on the storage medium of record 7, which the I/O routine then passes back to the file transfer program.

Consider the situation where records 13 through 15 are passed to the I/O routine, and are blocked in memory. If the file transfer stopped at this point for any reason, recovery must start with record 7 rather than record 16 because records 13 through 15 were never written to the storage medium, and thus cannot be recovered. Records 8 through 12 cannot be recovered because present access methods do not allow recovery to the middle of a block. In addition, though the file transfer's status information and file changing algorithms have progressed to record 15, they must be reset to record 7 so that the transfer can be resumed from record 7.

Some files do not allow a program to index into the middle of a file to start reading or writing. Recovery methods which involve indexing into the middle of both the source file and the destination file thus are not suitable for these types of files.

SUMMARY OF THE INVENTION

The present invention provides a general mechanism for specifying and keeping track of recovery information when writing to I/O devices that may not be able to immediately return information for a record.

When a record is passed to the I/O routine, the file transfer program saves all state information needed to recover that record. The state information consists of status information for monitoring, information needed when recovering file changing algorithms like stride and translation, and whatever else might be important about the current state of the transfer. An identifier is associated with the state information and passed to the I/O routine. The I/O routine must save this identifier until it has access method recovery information for the record. At that point, it returns both the access method recovery information and the identifier back to the file transfer program. The file transfer program can then keep track of both the access method recovery information and the state information so that if recovery becomes necessary, it can reset itself back to the appropriate state using the state information and tell the I/O routine to reset itself back to the appropriate state using the access method recovery information. In addition, if the I/O routine needs to save additional state information besides the access method recovery information, it can return this state information with the access method recovery information to the file transfer program to be saved. Records that cannot be recovered are stored in memory until the transfer reaches a point at which they can be recovered. Thus, the file transfer program does not index into the middle of the source file thereby providing for recovery of file types that do not support such indexing.

It is a primary object of the present invention to provide a file transfer program which may recover records previously transferred in the event the file transfer program stops.

It is another object of the present invention to provide a file transfer program that includes a user supplied conversion routine for converting records before storing them in an I/O device, and to save recovery information for each record converted by the conversion routine such that records may be recovered in the event the file transfer program stops.

It is another object of the present invention in which the file has multiple records in one or more blocks, to save the location in the I/O device in which a block of records is stored such that if the file transfer program stops, the first record in the block may be recovered.

It is another object of the present invention to provide for recovery of a file being transferred from a source to a destination without indexing into the middle of the source file.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
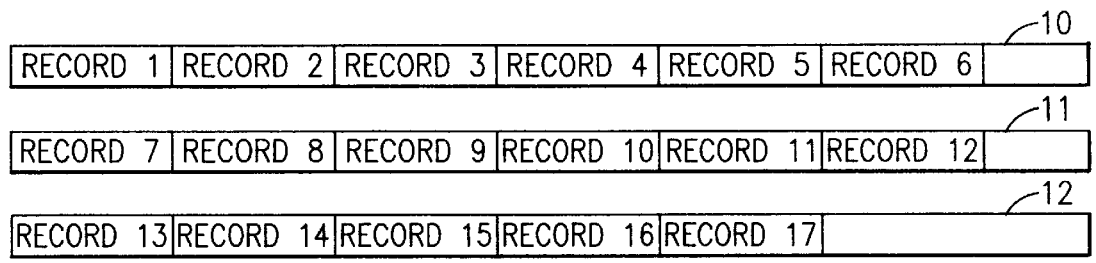
FIG. 1 is a diagrammatic representation of a file having three blocks, which file is transferred by either prior file transfer programs or transferred with the present invention.
Figure 2:
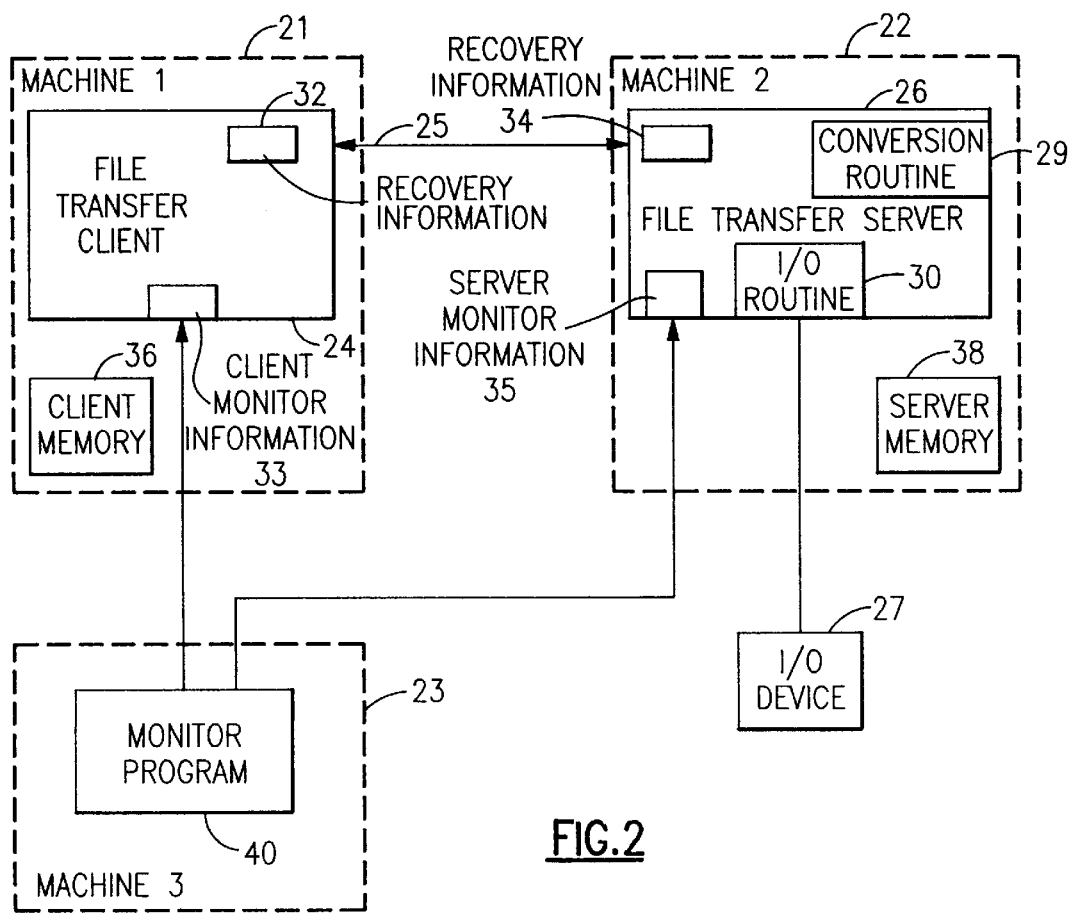
FIG. 2 is a block diagram of the present invention for transferring a file of FIG. 1 wherein each record on the file may be recovered if the transfer were stopped for any reason.

FIG. 2 is a block diagram of the present invention for transferring a file represented by, for instance, FIG. 1. The system of FIG. 2 includes three machines, 21, 22 and 23. The present invention is useable with a computer, which may include personal computers, workstations, or mainframes, which have access to I/O devices. Each of the machines 21, 22 and 23 may be individual computers, or may include computers connected into networks of nodes, with each node including a processor. In accordance with the present invention, the individual node may be viewed as a machine, or the entire network of nodes may be viewed as a machine. The present invention is directed to transferring files from one machine to another. For instance, the invention is useable with an IBM RS/6000 SP system, and is preferably included in the CLIO/S product from International Business Machines Corporation of Armonk, N.Y.

Machine 21 of FIG. 2 includes a file transfer client 24, and machine 22 includes a file transfer server 26, which serves I/O requests for writing to and reading from an I/O device 27. It will be understood that I/O device may be a tape drive or a disk drive, or any I/O device having a storage media on which data may be stored, and which may be written to or read from. Records and recovery information are transferred between the file transfer client 24 and the file transfer server 26 over the transfer path 25. It will be understood that the path 25 may be a bidirectional bus, a switch fabric, or any other data path used for transferring records in a file transfer operation. The file transfer server 26 includes a user supplied conversion routine 29 and a user supplied I/O routine 30. The conversion routine 29 converts data coming from file transfer client 24, or data going to file transfer client 24 in a file transfer operation, and the I/O routine is supplied to write data to and read data from the I/O device 27 by the file transfer program. The file transfer client 24 includes storage 32 for storing recovery information, and the file transfer server 26 includes storage 34, also for storing recovery information. Machine 21 includes client memory, and machine 22 includes server memory 38 for storing data as it is being transferred to the I/O device, as explained in connection with FIG. 1.

Machine 23 includes a monitor program 40, which may be the monitor program disclosed in U.S. Pat. No. 6,044,394, filed Jul. 21, 1997 for MANAGING DISTRIBUTED COMPLEX TASKS EXECUTING WITHIN A COMPUTER ENVIRONMENT assigned to the assignee of the present invention and incorporated herein by reference. The monitor program communicates with the file transfer client 24 and the file transfer server 26 to access client monitor information 33 and server monitor information 35. The monitor information comprises the name of the file, the total number of bytes transferred, the number of bytes transferred since the last time the transfer was resumed, the amount of time since the transfer was started, the amount of time since the last time the transfer was resumed, the state of the transfer, the amount of time the transfer has been sitting idle, and any other information that is needed or desired to show the progress of the file transfer operation.

The transfer of data in the present invention may be described as follows in connection with FIG. 1. When record 1 is passed to the I/O routine 30, the identifier of the state information associated with record 1 is passed with it. The I/O routine 30 must save this identifier until the access method recovery information that will allow recovery of record 1 is known. Records 2 through 5 are treated like record 1, except that since these records can't be recovered, there is no need to save the identifier associated with each of these records. When record 6 is handled and the block 10 is written to the storage medium of I/O device 27, the I/O routine 30 gets the recovery information from the access method. The I/O routine returns the access method recovery information to the file transfer program along with the identifier for record 1. The file transfer program now has all of the information that it needs to recover to record 1, and to reset all of its state information. The recovery information and state information is stored by the file server in storage 34 (which is shown as separate from server memory 38, but is actually a part of it), and is passed to the client in machine 21 and stored in the client recovery information storage 32 (which is actually a part of client memory 36).

When the file transfer client 24 receives the recovery information for record 7, it no longer needs to keep a copy of records 1 through 6. These can now be recovered by the file transfer server 26 if necessary. Up until this point in the transfer, it was necessary to store these records in the file transfer client memory 36. In most recovery mechanisms, these records were not stored because it is assumed that they could be recovered by the file transfer client 24 in the same way that the file transfer server 26 recovers its records. However, some types of files, such as named pipes of the IBM AIX operating system and batch pipes of the IBM MVS operating system do not allow for this recovery. By storing the records in the client memory 36, the file transfer client 24 can work with these types of files as well as with files that support recovery.

Record 7 will be treated like record 1. It is stored in the block in memory 38, and its identifier is saved in storage 34. Records 8 through 11 will be treated like records 2 through 5. When record 12 is handled, the block in memory 38 will be written to the storage medium of I/O device 27. The I/O routine 30 will get the recovery information from the file access method. The I/O routine 30 returns the access method recovery information to the file transfer program, along with the identifier associated with record 7. The file transfer program stores the information in storage 32, and now has all the information that it needs to recover to record 7 and reset all of its state information and the state information of the I/O routine.

Records 13 through 15 are stored in the block in memory 38, and as in the example of FIG. 1, the file transfer stops for some reason to be restarted later. When the transfer is restarted, record 7 was the last record that was handled. Therefore, the recovery information from record 7 is used to reset the state of the transfer and to tell the I/O routine 30 where to start writing (at the beginning of the block containing record 7). The transfer can then proceed, starting with record 7, until the transfer is finished, or until the transfer is stopped and restarted again.

Figure 3A:
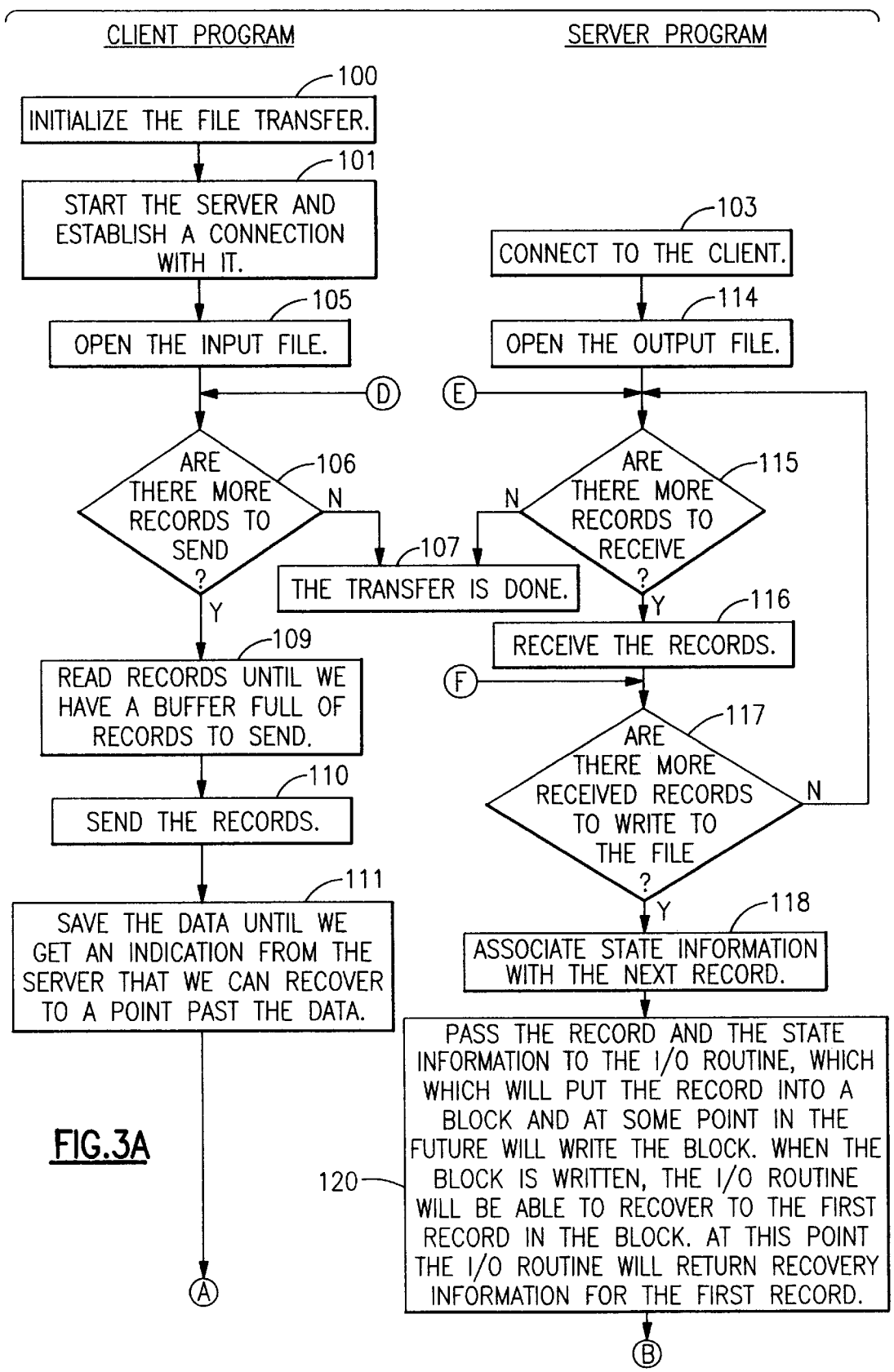
FIGS. 3A–3C, joined at connectors A, B, C, D, E, and F, form a flowchart of one embodiment of a file transfer program of the present invention comprising a client program and a server program of the present invention.
Figure 3B:
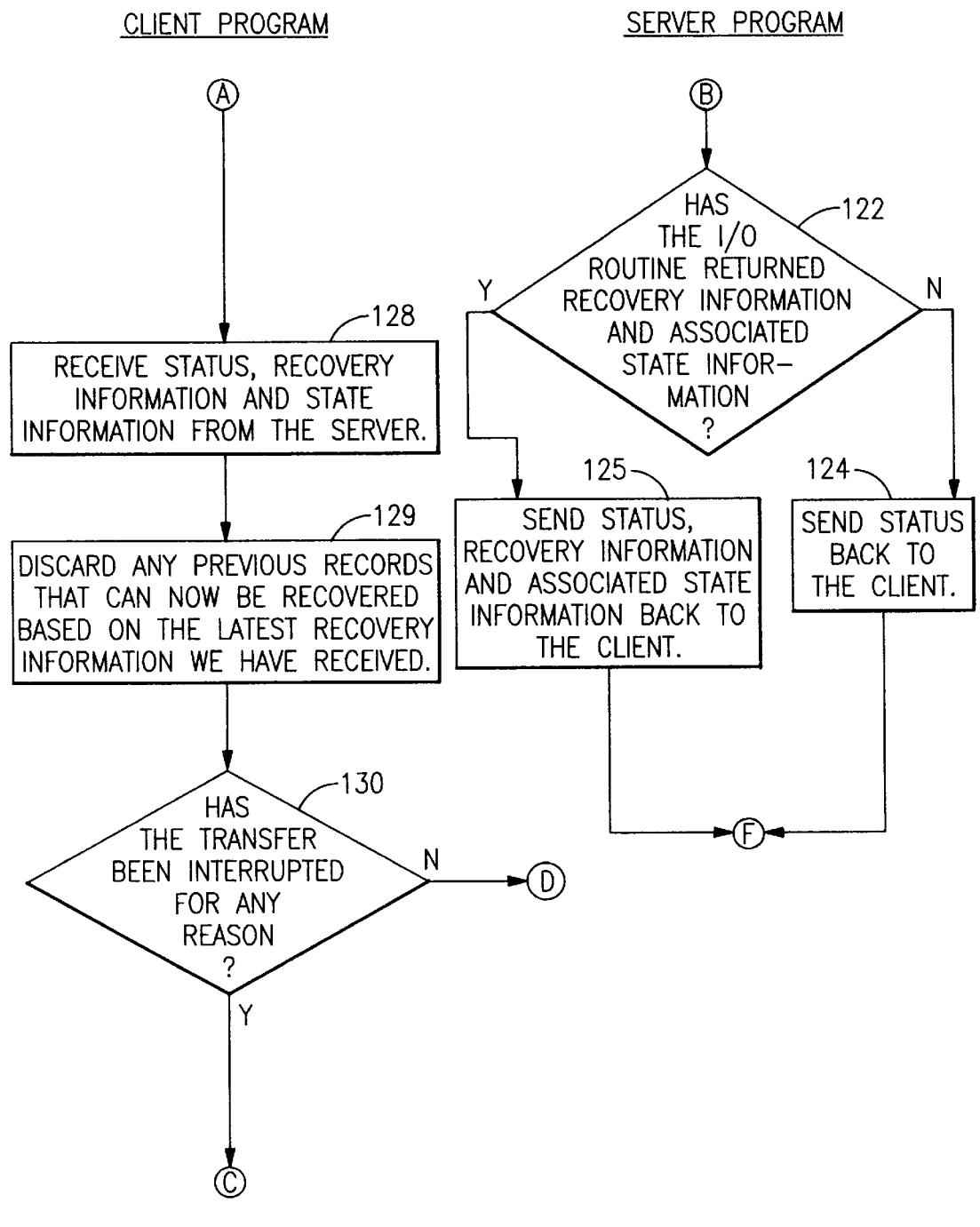
Figure 3C:
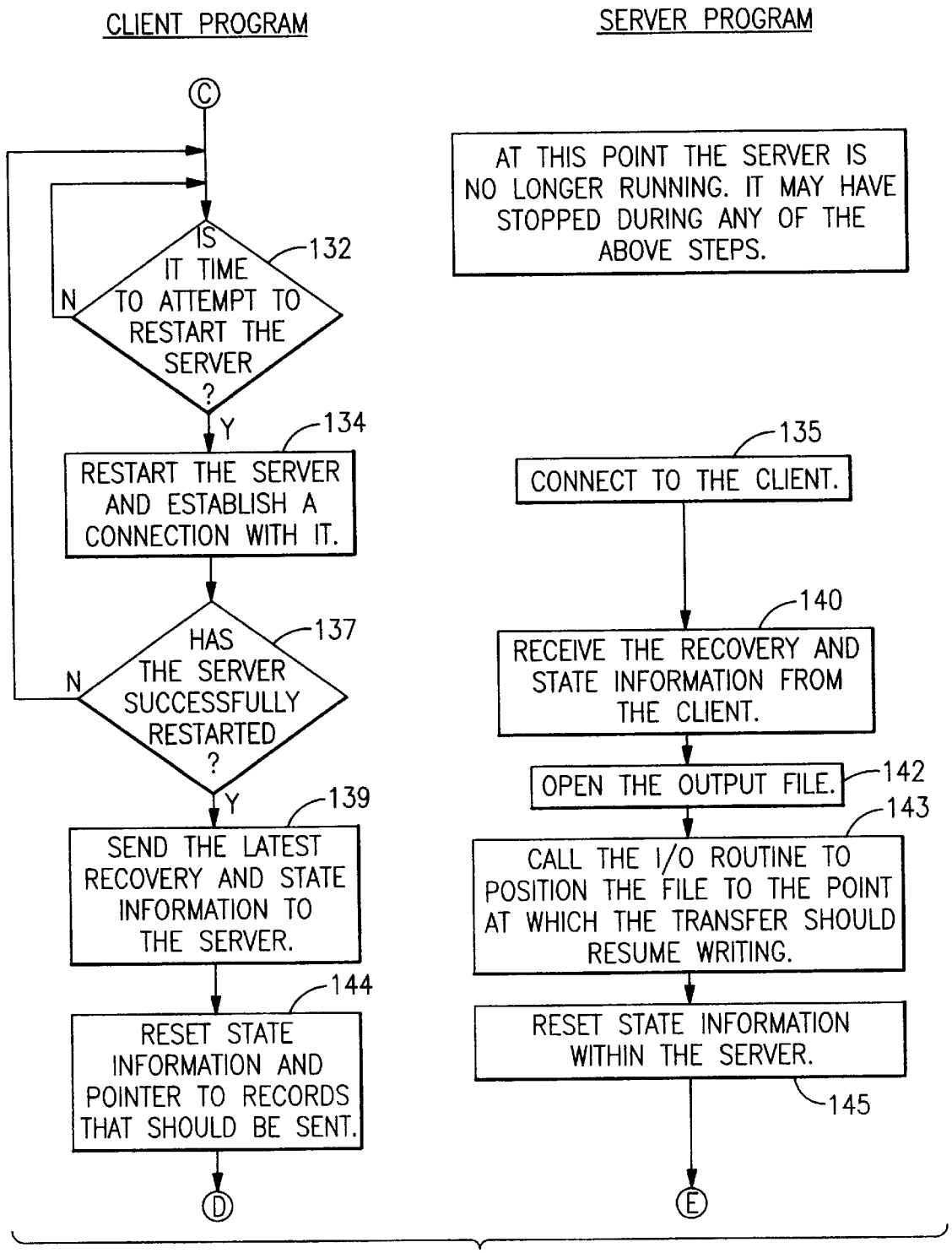

FIGS. 3A–3C, joined at connectors A, B, C, D, E, and F, form a flowchart of one embodiment of a file transfer program of the present invention comprising a client program and a server program. The lefthand column is a flowchart of the client program of the file transfer client 24 of FIG. 2, and the righthand column is a flowchart of the server program for the file transfer server 26 of FIG. 2. The flowcharts are organized such that simultaneous actions by the two programs are side by side.

At 100, the client program initializes the file transfer, and at 101, the client program starts the server and establishes a connection with it. At 103, the server program connects to the client. Returning to the client program, at 105 the input file is opened. At 106, a check is made to determine if more records are to be sent. If there are no more records to be sent at 106, the transfer is done at 107. If more records are to be sent at 106, the program goes to 109 and reads records until a buffer full of records is ready to send. The records are sent to the client at 110. At 111, the data is saved until the client receives an indication from the server that the client can recover to a point past the data.

Returning to the server, at 114 the server opens the output file, and at 115 checks to see if there are more records to receive from the client. If there are no more records to receive at 115, the transfer is done at 107. If there are more records to receive at 115, the server program goes to 116 where the records are received. At 117, a check is made to determine if there are more records to write to the file. If no, the program returns to 115. If there are more records to write to the file, the program goes to 118 to associate state information with the next record. At 120, the server program passes the record and state information to the I/O routine, which will put the record into a block in memory 38 of FIG. 2 to write the block to the I/O device 27. When the block is written, the I/O routine will be able to recover to the first record in the block, the I/O routine will return recovery information for the first record to the client program. The server program goes to 122 of FIG. 3B to determine if the I/O routine has returned recovery information and associated state information. If no, the status is sent to the client at 124. If yes, the status, recovery information, and associated state information is sent back to the client at 125. After 124 or 125, the server program returns to 117 to determine if there are more records to write to the file.

Returning to the client program, at 128, the client receives status, recovery information and state information from the server. At 129, the client discards any previous records that can now be recovered based on the latest recovery information now received from the server. The client now stores the status, recovery information and state information in the client storage 32, as discussed in connection with FIG. 2. The client program checks at 130 to determine if the transfer has been interrupted for any reason. If there is no interruption, the program returns to 106 to determine if there are more records to send.

If there has been an interruption at 130, the client program goes to FIG. 3C to a recover routine. At 132, the client program checks to determine if it is time to attempt to restart the server. It will be understood that at this point the server is no longer running as it may have stopped during any one of the previous steps, necessitating a recovery action. If it is determined at 132 that it is time to restart the server, the server is restarted and connection with it established at 134. At 135, the server program connects to the client. At 137, the client checks to determine if the server has successfully restarted. If not, the client program returns to 132 to continue to try to connect to the server. If the server has restarted, the client sends the server the latest recovery and state information at 139. At 140, the server program receives the recovery and state information from the client to the recovery storage 34 in the server. At 142, the server opens the output file, and at 143, calls the I/O routine to position the file to the point at which the transfer should resume writing. At 144, the client program resets the state information and the pointer to records that should be sent, and returns to 106 to determine if there are more records to send. At 145, the server program resets the state information within the server and returns to 115 to determine if there are more records to receive, to complete the recovery routine.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. A method for recovering records transferred by a file transfer program from a file transfer client to a file transfer server wherein the file comprises multiple block, each block having one or more records, said method comprising:

transferring a file from said file transfer client to said file transfer server a block at a time;

storing a previously transferred block in memory in said server;

converting each record by a conversion routine;

saving recovery information for each record converted by said conversion routine from said previously transferred block received by the server;

storing the block of records in an I/O device by an I/O routine;

sending said recovery information to said file transfer client to be used to recover records in said previously transferred block stored in memory in said server in the event said file transfer is stopped;

storing each block in memory in the file transfer client until that block has been stored in memory of the file transfer server such that it can be recovered by the file transfer server;

in the event that the file transfer program stops, sending the recovery information from the file transfer client to the file transfer server; and recovering the records of the blocks stored in the server memory in accordance with the recovery information received by the file transfer server.

2. The method of claim 1 further comprising:

including in the recovery information, the location in the I/O device of the start of the first record in said previously transferred block stored in memory of the server; and sending said location to the file transfer client with the recovery information.

3. The method of claim 1 further comprising storing monitoring information from monitoring the file transfer in the file transfer client and the file transfer server, and sending the monitoring information to a monitor program.

4. The method of claim 3 further comprising including said monitoring information from said file transfer server in said recovery information for use in recovery in the event that the file transfer program stops.

5. A file recovery system comprising:

a file transfer client for sending a computer file to a receiver, said file including a plurality of blocks, each block having one or more records;

a file transfer server for receiving said computer file from said file transfer client;

an I/O device connected to said file transfer server for storing the file sent from said file transfer client to said file transfer server;

a file transfer program for transferring said computer file from said file transfer client to said file transfer server a block at a time;

said file transfer program having an I/O routine for storing said transferred file in said I/O device a block at a time, said I/O routine sending recovery information to said file transfer program for each record of a previously transferred block received by said I/O routine such that records in said previously transferred block received may be restored in the event that the file transfer program stops transferring files;

a server memory for storing records transferred from said file transfer client to said file transfer server, and wherein said I/O routine moves a block of records from said server memory to said I/O device when said block of records has been stored in said server memory; and a client memory for storing the block of records being transferred from said file transfer client to said file transfer server, said client memory storing the block of records until it has been received in the server memory and the recovery information received by said client memory such that the block in said server memory may be recovered said recovery information being sent by said server program to said client program for use in recovery in the event said file transfer program stops; and said file transfer program includes a recovery routine for sending said recovery information from said client program to said server program in the event said file transfer program stops and a recovery is required, said recovery routine using said recovery information to recover said previously transferred blocks of records transferred from said file transfer client to said file transfer server without retransferring them.

6. The file recovery system of claim 5 wherein said file transfer program comprises a client program run by said file transfer client, and a server program run by said file transfer server.

7. The file recovery system of claim 6 wherein said I/O routine is in said server program.

8. The file recovery system of claim 2 wherein said server program further comprises a conversion routine for converting records received by said file transfer server and stored in said server memory before storing by said I/O routine in said I/O device.

9. The file recovery system of claim 8 wherein said recovery information includes information needed for recovering said conversion routine for said previously transferred block of records transferred to said file transfer server and stored in said server memory.

10. The file recovery system of claim 9 wherein said recovery information includes the location where the first record of the block of records in said server memory is to be stored in said I/O device.

11. The file recovery system of claim 1 further comprising:

client monitoring storage for storing client monitoring information about the transfer of the file from the file transfer client to the file transfer server;

server monitoring storage for storing server monitoring information about the transfer of the file from the file transfer client to the file transfer server; and a monitor program connected to said file transfer client and said file transfer server for accessing said client monitoring storage and said server monitoring storage for receiving monitoring information about the transfer of the file from the file transfer client to the file transfer server.

12. The file recovery system of claim 11 wherein said recovery information includes said server monitor information for use in recovery in the event said file transfer program stops.

13. The file recovery system of claim 5 further comprising recovery information storage in said server, said recovery information storage storing said recovery information received by said file transfer client from said file transfer server for said previously transferred block of records received by said file transfer server, said recovery information to be stored in said recovery information storage until receipt of recovery information for the next block of records received by the file transfer server from the file transfer client.

14. A program product recorded on a computer readable medium, said program product for recovering records transferred by a file transfer program from a file transfer client to a file transfer server wherein the file comprises multiple blocks, each block having one or more records, said program product performing a method comprising:

transferring a file from said file transfer client to said file transfer server a block at a time;

storing each block in memory in said file transfer server;

converting by a conversion routine, each record in a previously transferred block stored in memory in said file transfer server;

saving recovery information for each record converted by said conversion routine;

storing said previously transferred block in an I/O device by an I/O routine;

sending said recovery information for each record in said previously transferred block stored in memory in said file transfer server to said file transfer client to be used to recover records in the said previously transferred block stored in memory in said file transfer server, in the event said file transfer is stopped;

storing each block in memory in the file transfer client until that block has been stored in memory of the file transfer server such that it can be recovered by the file transfer server;

in the event that the file transfer program stops, sending the recovery information from the file transfer client to the file transfer server; and recovering the records of said previously transferred blocks stored in the server memory in accordance with the recovery information received by the file transfer server.

15. The program product performing the method of claim 14 further comprising:

including the location in the I/O device of the start of the first record in the previously transferred block stored in memory in the server in the recovery information; and sending said location to the file transfer client with the recovery information.

16. The program product performing the method of claim 14 further comprising storing monitoring information from monitoring the file transfer in the file transfer client and the file transfer server, and sending the monitoring information to a monitor program.

17. The program product performing the method of claim 16 further comprising including said monitoring information from said file transfer server in said recovery information for use in recovery in the event that the file transfer program stops.

* * * * *